US012595641B2

(12) United States Patent
Fabbri et al.

(10) Patent No.: US 12,595,641 B2
(45) Date of Patent: Apr. 7, 2026

(54) WORK VEHICLE PROVIDED WITH AN IMPROVED CONTROL SYSTEM

(71) Applicant: CNH Industrial Italia S.p.A., Turin (IT)

(72) Inventors: Giuseppe Fabbri, Ravenna (IT); Gimmi Sampaoli, Bagno di Romagna (IT)

(73) Assignee: CNH Industrial Italia S.p.A., Turin (IT)

( * ) Notice: Subject to any disclaimer, the term of this patent is extended or adjusted under 35 U.S.C. 154(b) by 7 days.

(21) Appl. No.: 18/602,544

(22) Filed: Mar. 12, 2024

(65) Prior Publication Data

US 2024/0309610 A1 Sep. 19, 2024

(30) Foreign Application Priority Data

Mar. 13, 2023 (IT) ........................ 102023000004662

(51) Int. Cl.
*B60T 7/08* (2006.01)
*B60T 13/22* (2006.01)
(Continued)

(52) U.S. Cl.
CPC .............. *E02F 9/2228* (2013.01); *B60T 7/08* (2013.01); *E02F 3/3414* (2013.01); *E02F 9/02* (2013.01);
(Continued)

(58) Field of Classification Search
CPC ........ E02F 9/2228; E02F 3/3414; E02F 9/02; E02F 9/2004; E02F 9/2083; E02F 9/226;
(Continued)

(56) References Cited

U.S. PATENT DOCUMENTS

| | | | |
|---|---|---|---|
| 5,875,701 | A | 3/1999 | Cobo et al. |
| 10,246,855 | B2 | 4/2019 | Greer |

(Continued)

FOREIGN PATENT DOCUMENTS

| | | |
|---|---|---|
| EP | 3719221 A1 | 10/2020 |
| JP | 2019044426 A | 3/2019 |

OTHER PUBLICATIONS

Italian Search Report and Opinion Corresponding to IT202300004662 on Oct. 9, 2023.

*Primary Examiner* — Ashley L Redhead, Jr.
(74) *Attorney, Agent, or Firm* — Dority & Manning, P.A.

(57) ABSTRACT

A work vehicle is provided with a body and ground engaging means configured to allow motion of the body on ground, and braking means for locking ground engaging means, and an operative element carried by said body and configured to execute a specific working operation. The work vehicle further includes a first and a second joystick configured to respectively control the operation of ground engaging means and operative element based on movement of joystick and first and second input means configured respectively to control the activation/deactivation of parking brake functionality of the work vehicle and the activation/deactivation of hydraulic systems of work vehicle. Furthermore, the work vehicle includes a control system configured to receive second and first control signals derived from first and second input means respectively and each configured to assume a respective activation value and a respective deactivation value and inhibit the operation of the joystick linked to the operation of ground engaging means if both control signals are in activation state.

11 Claims, 2 Drawing Sheets

(51) Int. Cl.

| | |
|---|---|
| *E02F 3/34* | (2006.01) |
| *E02F 9/02* | (2006.01) |
| *E02F 9/20* | (2006.01) |
| *E02F 9/22* | (2006.01) |

(52) U.S. Cl.
CPC .......... *E02F 9/2004* (2013.01); *E02F 9/2083* (2013.01); *B60T 13/22* (2013.01)

(58) Field of Classification Search
CPC ........ B60T 7/08; B60T 13/22; B60T 2260/09; B60T 1/062; B60T 7/104; B60T 7/105; B60T 7/107; B60T 11/103; B60T 11/105; B60T 13/02; B60T 13/12; B60T 13/66; B60T 13/662; B60T 15/045; B60T 7/102; B62D 51/02; B62D 51/007
See application file for complete search history.

(56)                       References Cited

U.S. PATENT DOCUMENTS

| | | | |
|---|---|---|---|
| 10,745,888 B2 | 8/2020 | Kukuk | |
| 2018/0058039 A1 | 3/2018 | Fredrickson et al. | |
| 2021/0002868 A1* | 1/2021 | Kumagai | E02F 9/2228 |
| 2021/0062912 A1 | 3/2021 | Knutson | |
| 2021/0094420 A1* | 4/2021 | Sosnowski | B60L 50/00 |

* cited by examiner

WORK VEHICLE PROVIDED WITH AN IMPROVED CONTROL SYSTEM

CROSS REFERENCE TO RELATED APPLICATIONS

The present application is based upon and claims the right of priority to Italian Patent Application Number 102023000004662, filed Mar. 13, 2023, the disclosure of which is hereby incorporated by reference herein in its entirety for all purposes.

TECHNICAL FIELD

The present invention concerns a control system for a work vehicle.

The present invention finds its preferred, although not exclusive, application in earth moving machines such as a track loader. Reference will be made to this application by way of example below.

BACKGROUND OF THE INVENTION

Loaders are earth moving machines voted to earth displacement via an operative element such as a bucket moved by a boom. Usually the driver is placed on a driving portion provided with a left and a right joystick configured to allow vehicle control and a plurality of buttons configured to allow activation or deactivation of specific functions.

In detail, one of the joystick is used for controlling motion of the loader via ground engaging means, e.g. tracks, and the other joystick is used for controlling operation of the aforementioned operative element.

In particular, during operation of the operative element, the parking brake is activated by mechanical locking the track and one of the joystick is used for controlling the implement operation.

However, since both joystick are operative, it may happen that the driver moves the motion control joystick thereby forcing the mechanical lock of the track.

Accordingly, it is possible to damage the brake or to reduce its useful life.

Clearly, furthermore, in case of failure of the brake, the aforementioned condition is not at all safe for the driver that could be fall from the vehicle due to a sudden motion of the latter.

Therefore, the need is felt to reduce the risk of improper activation of the motion of the loader while the parking brake is activated.

An aim of the present invention is to satisfy the above mentioned needs in a cost-effective and optimized manner.

SUMMARY OF THE INVENTION

The aforementioned aim is reached by a work vehicle and a method as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

Figure 1:
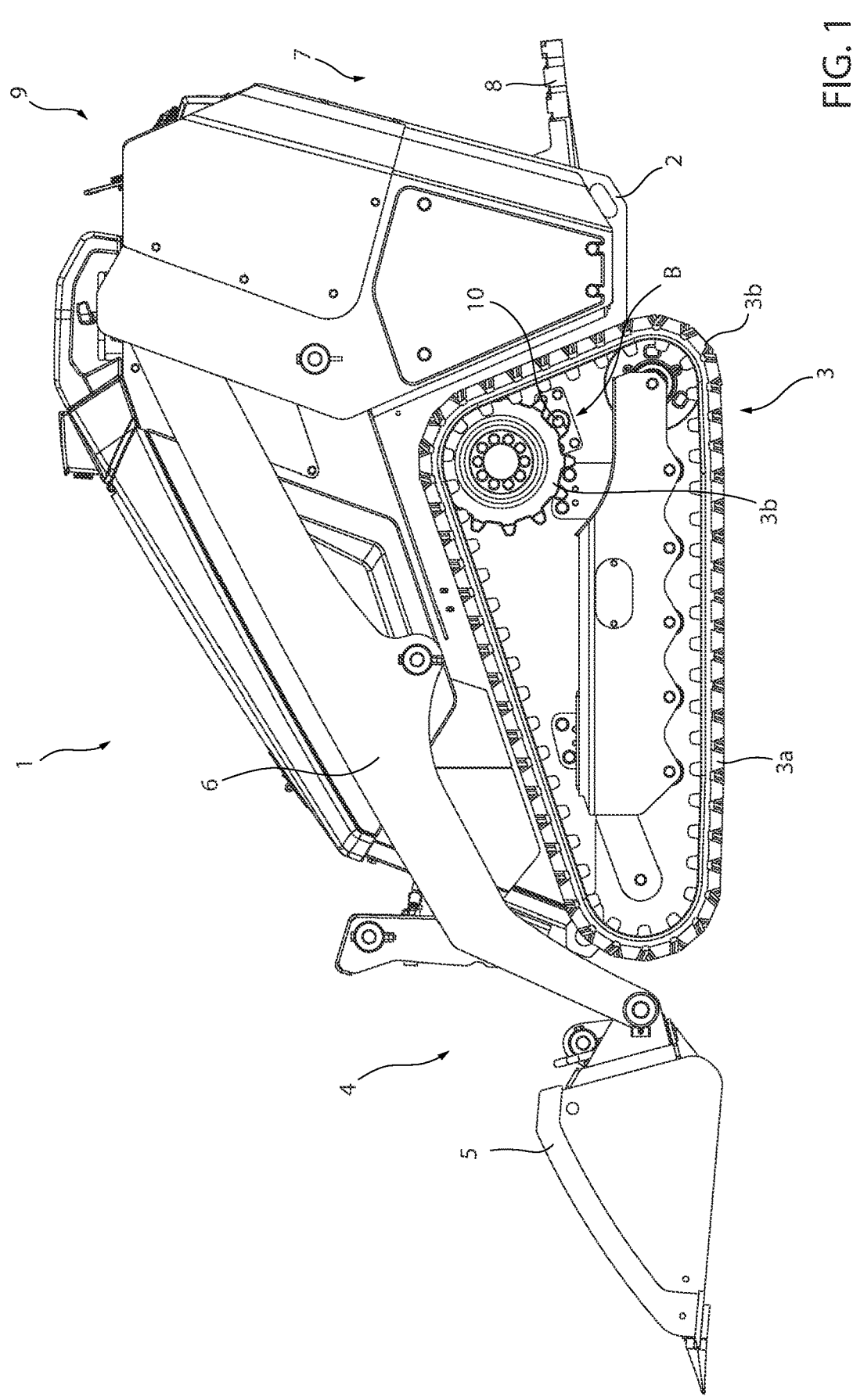
FIG. 1 is a lateral view of the work of a work vehicle according to the invention.

FIG. 1 discloses a work vehicle 1 such as a earth moving machine and in the shown embodiment a loader. Work vehicle 1 comprises essentially a body 2 that is movably on ground via ground engaging means 3, in the shown embodiment a track arrangement 3'.

The track arrangement 3', in particular, comprises a track belt 3a carried in motion a motion wheel 3b that is carried by a propulsion system of the work vehicle 1 (not shown) and rotatably free carried by body 2.

The work vehicle comprises brake means B configured to provide a parking brake functionality to work vehicle 1. In particular, brake means B are configured to lock the position of the motion wheel 3b, thereby locking the motion of the track belt 3a and therefore of work vehicle 1.

Such brake means advantageously comprises a locking pin 10 fixedly carried by body 2 and configured to selectively interpose between a pair of wheels of the motion wheel 3b thereby locking its movement.

The work vehicle 1 further comprises an operative element 4 configured to execute a specific work operation. In the described embodiment, the operative element comprises a bucket 5 carried by a boom 6 hinged at its extremities to the bucket and to the body 2.

The body 2 defines a driving portion 7 configured to house a driver to control the functionality of work vehicle 1. In the disclosed embodiment, driving portion 7 allows the driver to stand on the body 2 to control the work vehicle 1 and therefore comprises a step 8 fixedly carried by the body 2 in a lower portion thereof and a dashboard 9 comprising control means, as discussed in detail in the following in an upper portion of the body 2.

Figure 2:
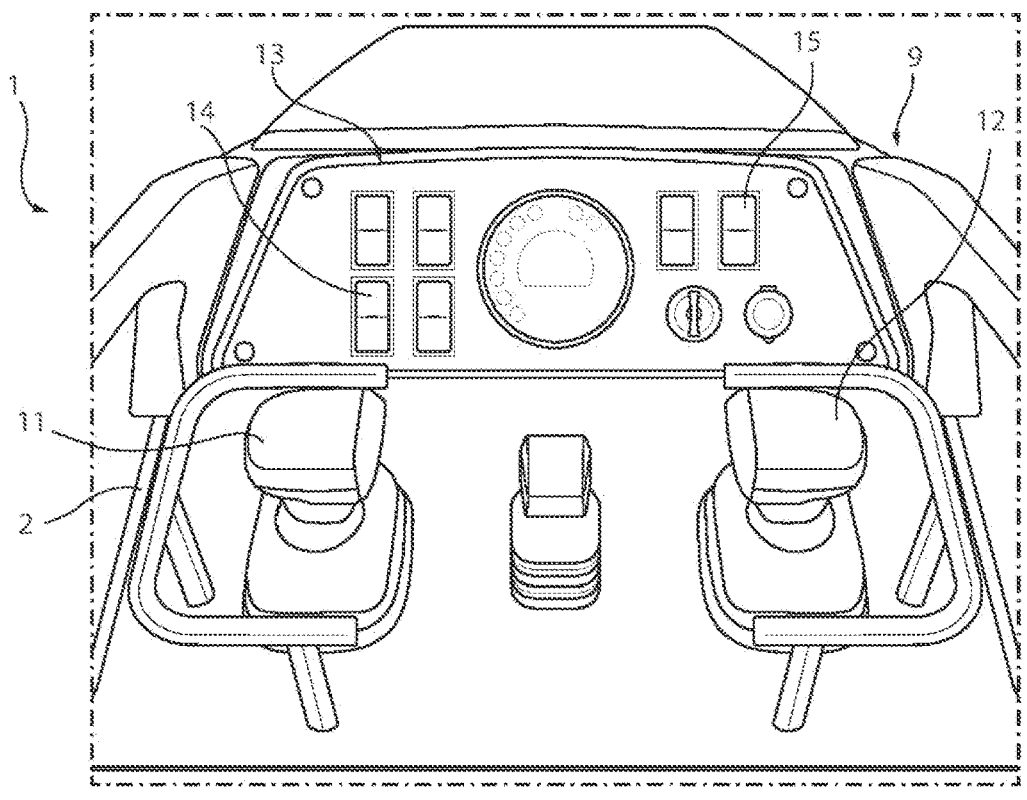
FIG. 2 is a perspective view of a portion of the word vehicle of FIG. 1.
Figure 3:
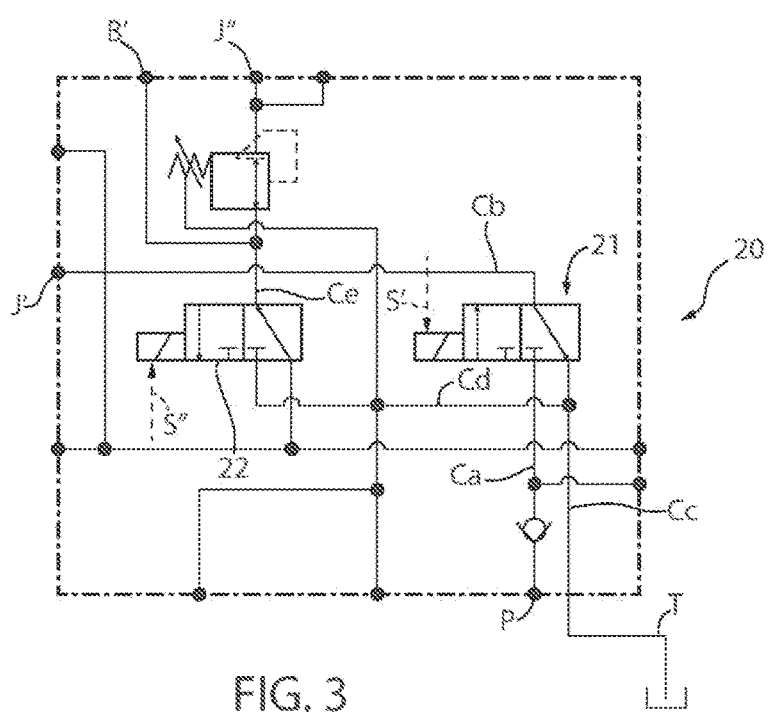
FIG. 3 is a schematic showing a hydraulic system according to the invention.

As better shown in FIG. 2, the dashboard 9 comprises a pair of joysticks 11, 12, namely a left and a right joystick, and an instrument panel 13 provided with output means such as displays or indicators configured to allow display of information related to the operation of the work vehicle and input means configured to allow input by the driver such as icon or a display or, in the shown embodiments, buttons.

In particular, instrument panel 13 comprises at least a first and a second input means 14, 15, both realized as buttons. The first input means 14 are configured to control, namely activate or deactivate, a parking brake functionality of the vehicle while the second input means 15 are configured to control, namely activate or deactivate, hydraulic functions of the vehicle.

In detail, joysticks 11, 12 are configured to control, respectively, motion of the vehicle, i.e. controlling operation of the ground engaging means 3 and the operation of the operative element 4, i.e. the controlling operation of bucket 5 and/or boom 6.

In particular, joystick movements 11, 12, i.e. relative position of joystick 11, 12 with respect to their support base on dashboard 9, are configured to provide control signals to hydraulic systems (not shown) configured to control the ground engaging means 3 and the hydraulic actuators of boom/bucket 4, 5. Different ways to provide such control are foreseen in the art and will not be described for sake of brevity and being not strictly linked to the present invention.

Therefore, the second input means 15 are configured to allow the pressurization of the aforementioned hydraulic systems thereby allowing the effective use of joysticks 11, 12.

According to the invention, it is provided a control system 20 configured to receive input control signals S', S" derived from first and second input means 14, 15 respectively and each configured to assume a respective activation value and a respective deactivation value and inhibit the operation of the joystick 11 linked to the ground engaging means 3 if both the control signals S', S" are in activation state.

It is noticed that control signals S', S" are independent signals that can be actuated separately one with respect to the other acting on respectively first and second input means 14, 15.

In particular, system 20 is a hydraulic circuit comprising a first valve 21 and a second valve 22, in particular both are three ways-two positions valves and more in particular electro-hydraulic valves.

The first valve 21 is configured to receive an electric control signal S' derived from second input means 15 actuation by the driver and the second valve 22 is configured to receive an electric control signal S" derived from first input means 14 actuation by the driver.

In particular, the first valve 21 is fluidly connected to a source P of pressurized fluid by a first conduit Ca, to a second joystick port J' by a second conduit Cb and to a discharge T by a third conduit Cc. The second valve 22 is fluidly connected by a fourth conduit Cd to the third conduit Cc and by a fifth conduit Ce to a first joystick port J" and to a brake port B' fluidly connected to the aforementioned fifth conduit Ce.

In detail, first valve 21 is configured to assume a first operative configuration wherein retaining means maintains the first valve 21 so that second conduit Cb is fluidly connected to discharge T and source P is disconnected to second conduit Cb and a second operative configuration wherein the coil acts against retaining means so that the discharge T is disconnected to second conduit Cb that is instead connected to source P.

In detail, second valve 22 is configured to assume a first operative configuration wherein retaining means maintains the second valve 22 so that second conduit Cb is fluidly connected to fifth conduit Ce and fourth conduit Cd, therefore discharge T, is disconnected with respect to fifth conduit Ce and a second operative configuration wherein the coil acts against retaining means so that fifth conduit Ce is fluidly connected to the fourth conduit Cd and therefore to discharge and the second conduit Cb is disconnected to the fifth conduit Ce.

Brake means B according to the above control system 20 may advantageously be negatively actuated, i.e. the brake means B are maintained in a fail safe system and are released only by fluid pressure coming into the brake actuator. When brake port B' is fluidly pressurized, then the pin element 10 is disengaged from motion wheel 10*a*, on the contrary, it lock the ground engaging means 3.

The hydraulic circuit may further comprise other elements such as check valves, relief valve or other ports and not described herewith for sake of brevity.

The work vehicle 1 clearly comprises an electronic control electrically connected to first and second input means 14 and 15 and comprising elaboration means to elaborate the data acquired by the first and second input means 14 and 15 to control consequently valves 21, 22. In particular, the electronic control unit may provide activation/deactivation value control signals S', S" based on the selection by the driver of first and second input means 14, 15, e.g. pushing or releasing the button. Similarly, the electronic control unit is configured to allow control of the operative element 4 and of the ground engaging means 3 in function of the movement of joysticks 11, 12, as per se known and realized in many different manners.

The operation of the embodiment of the invention as described above is the following.

The driver may activate the hydraulic functions of the work vehicle 1 by activating second input means 15. In this way, first input control signal S' passes in actuation value and excite coil of first valve 21 that move against retaining means thereby allowing fluid communication between first conduit Ca and second conduit Cb and isolating discharge T. In this way, pressurized fluid flows towards first joystick port J' and via second valve 22 towards second joystick port J" and to brake port B'. The fluid from first joystick port J' may be used via second joystick 12 to control operation of the operative element 4 while the fluid from second joystick port J" may be used via first joystick 11 to control the operation of the ground engaging means 3. Since pressurized fluid is sent to brake port B', the pin 10 frees the motion wheels 10 thereby allowing motion of track arrangement 3'.

If needed to park the work vehicle 1 while continuing operations with the operative element 4, the used may activate the brake means B via first input means 14. In this way the coil of second valve 21 that move against retaining means thereby allowing fluid communication between fifth and fourth conduits Ce, Cd towards discharge T and isolating second conduit Cb. In this way, pressurized fluid flows towards first joystick port J' while second joystick port J" and brake port B' is sent to discharge. In this way, fluid from first joystick port J' may be used via second joystick 12 to control operation of the operative element 4 while the second joystick port J" is discharged thereby preventing any actuation of ground engaging means 3 and activating at the same time braking means B thereby securing any movement of work vehicle 1.

In view of the foregoing the present invention is further related to a control method for the above described control system comprising the following steps:

i) Detecting the value of a first input S' from second input means 15 of the work vehicle 1;

ii) If the first input S' is at an activation value provide pressurized fluid to first and second ports J', J" related to the operation controlled by first and second joysticks 12;

iii) Detecting the value of a second input S" from first input means 14 of the work vehicle 1;

iv) If the second input S" is at a deactivation value, then return to step i), otherwise proceed to step v)

v) If the second input S" is at an activation value, provide pressurized fluid to first the first port J' related to first joystick 11 and inhibit the pressurization of second port J" related to second joystick 12 and return to step i).

In particular, the step ii) may further comprise sending pressurized fluid to brake port B' to release brake means B, while step v) may further comprise inhibit pressurization of brake port B' thereby activating brake means B.

The inhibition mentioned above may comprise the fluid connection of second port J" and brake port B' to discharge.

The aforementioned step may be memorized in the electronic control unit of the work vehicle and executed automatically.

In view of the foregoing, the advantages of the work vehicle and method according to the invention are apparent.

The proposed control system and in particular the provided hydraulic control system 20 allows to control the operative element of the work vehicle while avoiding any possible control of the propulsion system, thereby avoiding improper pressure on brake means.

In this way, the user may freely use the related joystick to control the operative element of the work vehicle without fear of wasting the useful life of brake means or causing a sudden break thereof.

Moreover, since oil consumption is reduced, the overall energy consumption of the work vehicle is increased.

It is furthermore noticed that the propose hydraulic control system 20 may be integrated in the hydraulic system of the vehicle in a very economic and compact manner without increasing excessively costs of manufacturing or wasting useful space in the vehicle.

It is clear that modifications can be made to the described work vehicle and method which do not extend beyond the scope of protection defined by the claims.

For example, the control system may be realized in a different manner, in particular comprising a different hydraulic topology.

Similarly, ground engaging means and brake means may be realized by equivalent function means.

Clearly joysticks and input means may be disposed differently on the work vehicle that may be of any suitable typology.

The invention claimed is:

1. A work vehicle comprising a body and ground engaging elements configured to allow motion of the body on the ground, braking elements for locking the ground engaging elements, and an operative element carried by the body and configured to execute a specific working operation, the work vehicle further comprising a first joystick and a second joystick configured to respectively control the operation of the ground engaging elements and the operative element based on movement of the corresponding joystick, the work vehicle further comprising first and second input devices configured respectively to control the activation/deactivation of a parking brake functionality of the work vehicle and the activation/deactivation of hydraulic systems of the work vehicle, the work vehicle further comprising a control system configured to receive second and first control signals derived from the first and second input devices, respectively, and the second and first control signals each configured to assume a respective activation value and a respective deactivation value and inhibit the operation of the first or second joystick linked to the operation of the ground engaging elements when both the second and first control signals are in activation state, the control system comprising a first valve and a second valve that are electrically controlled by the first and second control signals, and the second valve configured to assume a first configuration when the second control signal is a deactivated state, the second valve allowing fluid communication between the first valve and a second joystick port in the first configuration, the second valve further configured to assume a second configuration when the control signal is an activated state, the second valve allows fluid communication between the second joystick port and a discharge.

2. The work vehicle according to claim 1, wherein the control system is a hydraulic control system.

3. The work vehicle according to claim 1, wherein the first and second valves are three-way, two-position valves.

4. The work vehicle according to claim 3, wherein the first valve is configured to assume a first configuration when the first control signal is deactivated state, wherein a source of fluid in pressure is disconnected from a first joystick port, and the second joystick port is operationally linked to the first and second joysticks, respectively, and the first valve is configured to assume a second configuration when the first control signal is an activated state, wherein the source of fluid in pressure is connected to the first and second joystick ports.

5. The work vehicle according to claim 1, wherein the brake elements are negatively actuated brake elements, the second valve is further configured in its first and second configurations to allow fluidic communication from a brake port to the first valve and to the discharge, respectively.

6. The work vehicle according to claim 1, wherein the first and second input devices are buttons on a dashboard of the work vehicle.

7. The work vehicle according to claim 1, wherein the ground engaging elements comprises a track arrangement provided with a motion wheel and a track, the braking elements comprising a pin configured to selectively fix the motion wheel to the body of the work vehicle.

8. The work vehicle according to claim 1, further comprising an electronic control electrically connected to the first and second input devices and comprising an elaboration device to elaborate the data acquired by the first and second input devices to control subsequent valves.

9. A control method for controlling a work vehicle according to claim 8, the control method comprising:
   i) detecting the value of a first input from the second input device of the work vehicle;
   ii) when the first input is at an activation value, provide pressurized fluid to the first and second ports related to the operation controlled by the first and second joysticks;
   iii) detecting the value of a second input from the first input device of the work vehicle;
   iv) when the second input is at a deactivation value, then return to i), otherwise proceed to v)
   v) when the second input is at an activation value, provide pressurized fluid to the first port related to the first joystick and inhibit the pressurization of the second port related to the second joystick and return to i).

10. The control method according to claim 9, wherein ii) further comprises sending pressurized fluid to a brake port to release brake elements and v) further comprises inhibition of pressurization of the brake port, thereby activating brake elements.

11. Control method according to claim 9, wherein the inhibition comprises the fluid connection of the second port and/or a brake port to the discharge.

* * * * *